(12) United States Patent
Wang et al.

(10) Patent No.: US 7,205,370 B2
(45) Date of Patent: Apr. 17, 2007

(54) POLYMERIC NANO-PARTICLES OF FLOWER-LIKE STRUCTURE AND APPLICATIONS

(75) Inventors: Xiaorong Wang, Hudson, OH (US); Yoichi Ozawa, Kodaira (JP); James E. Hall, Mogadore, OH (US)

(73) Assignee: Bridgestone Corporation, Chuo-ku Tokyo (JP)

( * ) Notice: Subject to any disclaimer, the term of this patent is extended or adjusted under 35 U.S.C. 154(b) by 283 days.

(21) Appl. No.: 10/755,648

(22) Filed: Jan. 12, 2004

(65) Prior Publication Data

US 2005/0154117 A1 Jul. 14, 2005

(51) Int. Cl.
C08F 36/06 (2006.01)
C08F 136/06 (2006.01)

(52) U.S. Cl. .............. 526/335; 526/336; 526/346; 526/347.1; 524/314; 524/316; 524/332

(58) Field of Classification Search ........... 526/335, 526/336, 346, 347.1; 524/314, 316, 332
See application file for complete search history.

(56) References Cited

U.S. PATENT DOCUMENTS

| | | | |
|---|---|---|---|
| 3,598,884 A * | 8/1971 | Wei et al. ............... 525/89 |
| 3,972,963 A | 8/1976 | Schwab et al. | |
| 4,233,409 A | 11/1980 | Bulkley | |
| 4,463,129 A | 7/1984 | Shinada et al. | |
| 4,543,403 A | 9/1985 | Isayama et al. | |
| 4,659,790 A | 4/1987 | Shimozato et al. | |
| 4,764,572 A | 8/1988 | Bean, Jr. | |
| 4,773,521 A | 9/1988 | Chen | |
| 4,788,254 A | 11/1988 | Kawakubo et al. | |
| 4,829,130 A | 5/1989 | Licchelli et al. | |
| 4,829,135 A | 5/1989 | Gunesin et al. | |
| 4,837,274 A | 6/1989 | Kawakubo et al. | |
| 4,837,401 A | 6/1989 | Hirose et al. | |
| 4,870,144 A | 9/1989 | Noda et al. | |
| 4,871,814 A | 10/1989 | Gunesin et al. | |
| 4,904,730 A | 2/1990 | Moore et al. | |
| 4,904,732 A | 2/1990 | Iwahara et al. | |
| 4,906,695 A | 3/1990 | Blizzard et al. | |
| 4,920,160 A | 4/1990 | Chip et al. | |
| 4,942,209 A | 7/1990 | Gunesin | |

(Continued)

FOREIGN PATENT DOCUMENTS

EP 143500 6/1985

(Continued)

OTHER PUBLICATIONS

Greenwood, N.N.; Earnshaw, A., Chemistry of the Elements, pp. 1126-1127, Pergaroen Press, New York 1984.

(Continued)

Primary Examiner—Ling-Sui Choi
(74) Attorney, Agent, or Firm—Meredith E. Hooker (57) ABSTRACT

A flower-like nano-particle composition including a poly (alkenylbenzene) core and a poly (conjugated diene) or a poly(alkylene) surface layer is provided. The nano-particles have a mean average diameter less than about 100 nm and are substantially free of chain ends. The nano-particles can be modified via, for example, hydrogenation. The nano-particles can advantageously be incorporated into rubbers, elastomers, and thermoplastics.

6 Claims, 2 Drawing Sheets

U.S. PATENT DOCUMENTS

| | | |
|---|---|---|
| 5,036,138 A | 7/1991 | Stamhuis et al. |
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,331,035 A | 7/1994 | Hall |
| 5,336,712 A | 8/1994 | Austgen, Jr. et al. |
| 5,395,902 A | 3/1995 | Hall |
| 5,399,628 A | 3/1995 | Moczygemba et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A * | 10/1995 | Lo et al. ...................... 525/314 |
| 5,514,753 A | 5/1996 | Ozawa et al. |
| 5,525,639 A | 6/1996 | Keneko et al. |
| 5,527,870 A | 6/1996 | Maeda et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,688,856 A | 11/1997 | Austgen, Jr. et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,763,551 A | 6/1998 | Wunsch et al. |
| 5,773,521 A * | 6/1998 | Hoxmeier et al. .......... 525/316 |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,147,151 A | 11/2000 | Fukumoto et al. |
| 6,180,693 B1 | 1/2001 | Tang et al. |
| 6,191,217 B1 | 2/2001 | Wang et al. |
| 6,204,354 B1 | 3/2001 | Wang et al. |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,420,486 B1 | 7/2002 | DePorter et al. |
| 6,437,050 B1 | 8/2002 | Krom et al. |
| 6,489,378 B1 | 12/2002 | Sosa et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,689,469 B2 * | 2/2004 | Wang et al. ................. 428/403 |
| 6,750,297 B2 | 6/2004 | Yeu et al. |
| 6,759,464 B2 | 7/2004 | Ajbani et al. |
| 6,777,500 B2 | 8/2004 | Lean et al. |
| 6,780,937 B2 | 8/2004 | Castner |
| 6,835,781 B2 | 12/2004 | Kondou et al. |
| 6,872,785 B2 | 3/2005 | Wang et al. |
| 6,875,818 B2 * | 4/2005 | Wang .......................... 525/313 |
| 2002/0045714 A1 | 4/2002 | Tomalia et al. |
| 2002/0095008 A1 | 7/2002 | Helmrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 * | 8/2003 | Wang et al. ................. 525/313 |
| 2003/0198810 A1 | 10/2003 | Wang et al. |
| 2003/0225190 A1 | 12/2003 | Borbely et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0203248 A1 | 9/2005 | Zheng et al. |

FOREIGN PATENT DOCUMENTS

| | | |
|---|---|---|
| EP | 0 255 170 A1 | 2/1988 |
| EP | 0 265 142 A2 | 4/1988 |
| EP | 265142 | 4/1988 |
| EP | 0 590 491 A2 | 4/1994 |
| EP | 1 099 728 A1 | 5/2001 |
| EP | 1 134 251 A1 | 9/2001 |
| JP | 01279943 | 1/1989 |
| JP | 05132605 | 5/1993 |
| JP | 08-199062 | 8/1996 |
| WO | WO 91/04992 | 4/1991 |
| WO | WO 01/87999 A2 | 11/2000 |
| WO | WO 00/75226 A1 | 12/2000 |
| WO | WO 02/31002 A1 | 4/2002 |
| WO | WO 02/081233 | 10/2002 |
| WO | WO 02/100936 | 12/2002 |
| WO | WO 03/085040 | 10/2003 |
| WO | WO2004/058874 | 7/2004 |

OTHER PUBLICATIONS

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomalous Behaviour of Solutions of Styrene-Butadiene Block Copolymers in Some Solvents, Tuzar et al., Makromol. Chem. 178, 22743-2746 (1977).

Association of Block Copolymers in Selective Solvents, 1 Measurements on Hydrogenated Poly(styrene-isoprene) in Decane and in trans-Decalin, Mandema et al., Makromol. Chem. 180, 1521-1538 (1979).

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Willey & Sons, Inc.

R.P. Quirk and S.C. Galvan, Macromolecules, 34, 1192-1197 (2001).

M. Moller, J.P. Spaz, A. Roescher, S. Mobmer, S.T. Selvan, H.A. Klok, Macromol. Symp. 117,207-218 (1997).

T. Cosgrove, J.S. Phipps, R.M. Richardson, Macromolecules, 26, 4363-4367 (1993).

S. Mossmer, J.P. Spatz, M.Moller, T. Aberle, J. Schmidt, W. Burchard, Macromol. 33, 4791-4798 (2000).

Functionalized Core Shell Polymers Prepared by Microemulsion Polymerization,E. Mendizabal, J.E. Pugl, A. Aguiar, S. Gonzalez-Villegas, 477/Antec '97/1733-1737.

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.

* cited by examiner

POLYMERIC NANO-PARTICLES OF FLOWER-LIKE STRUCTURE AND APPLICATIONS

BACKGROUND OF THE INVENTION

The present invention relates to flower-like polymer nano-particles, methods for their preparation, and their use as, for example, additives for rubber, including natural and synthetic elastomers. The invention advantageously provides several mechanisms for surface modifications and general characteristic tailoring to improve performance in rubbers, elastomers, and thermoplastics.

Polymer nano-particles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

Nano-particles can be discrete particles uniformly dispersed throughout a host composition. Nano-particles preferably are monodisperse in size and uniform in shape. However, controlling the size of nano-particles during polymerization and/or the surface characteristics of such nano-particles can be difficult. Traditional spherical nano-particles may have a high number of chain ends in the individual nano-particles. It has been theorized that these chain ends may alter the hysteresis values of rubber compositions modified with nano-particles. Accordingly, achieving better control over the surface composition, i.e., decreasing the number of polymer chain ends in the nano-particle surface layers, of such polymer nano-particles also is desirable.

Rubbers may be advantageously modified by the addition of various polymer compositions. The physical properties of rubber moldability and tenacity are often improved through such modifications. Of course, however, the simple indiscriminate addition of nano-particles to rubber is likely to cause degradation of the matrix material, i.e., the rubber, characteristics. Moreover, it is expected that primarily the selection of nano-particles having suitable size, material composition, and surface chemistry, etc., will improve the matrix characteristics.

In this regard, development of nano-particles having a surface layer with fewer chain ends, which would be compatible with a wide variety of matrix materials, is desirable because discrete particles could likely disperse evenly throughout the host to provide a uniform matrix composition. However, the development of a process capable of reliably producing acceptable nano-particles has been a challenging endeavor. For example, the solubility of various monomers in traditional alkane solvents has made solution polymerization a difficult process by which to achieve nano-particles having a variety of surface layers. Moreover, the development of a solution polymerization process producing reliable nano-particles, particularly nano-particles advantageously employed in rubber compositions, has been elusive.

SUMMARY OF THE INVENTION

A flower-like nano-particle composition including a poly (alkenylbenzene) core and a poly (conjugated diene) surface layer is provided. The nano-particles have a mean average diameter less than about 100 nm and substantially no free chain ends within the nano-particle.

A flower-like nano-particle composition including polyalkylene is provided. The nano-particles include a poly (alkenylbenzene) core, and a polyalkylene surface layer including at least one alkylene monomer unit. The nano-particles have a mean average diameter less than about 100 nm, and are substantially free of chain ends within the nano-particles.

A process for forming flower-like polymer nano-particles is also provided. The particles may be formed by first initiating a conjugated diene polymerization in a hydrocarbon solvent with a divalent anionic initiator to form a living anionic polymerization with two living ends. Alkenylbenzene monomer may then be added and reacted with the living chain ends to form triblock polymer chains with living alkenylbenzene chain ends. A polymerization mixture including micelles of the triblock polymer is then formed, with living alkenylbenzene chain ends substantially located in an interior of the micelles. At least one crosslinking agent is then added to the polymerization mixture to form crosslinked, flower-like nano-particles from the micelles. The nano-particles having a flower-like structure therefore include an alkenylbenzene core and a conjugated diene surface. The poly(conjugated diene) layer is optionally hydrogenated to form nano-particles containing a poly(alkenylbenzene) core and a polycrystalline outer layer.

According to an additional embodiment, a soft gel composition including a thermoplastic. elastomer, flower-like nano-particles, and an extender is provided. The composition is useful in producing molded products having heat resistance, high elasticity, excellent damping and super soft properties. A process for forming the nano-particles containing soft gel composition is also provided.

According to a further embodiment, a rubber composition including an elastomer, flower-like nano-particles, carbon black filler and a curing agent is provided. Such compositions can be useful in producing tread rubber, side walls, and other similar materials. A process for forming the rubber composition is also provided.

A silica rubber composition including an elastomer, flower-like nano-particles, silica and a curing agent having low shrinkage properties is provided. A process for preparing the silica rubber compound is similarly provided.

A rubber compound composition for engine mount usage is provided. Such a compound demonstrates relatively high hysterisis, good tensile strength, strong resistance to creep, and high temperature resistance. A process of making the rubber compound for engine mount applications is similarly provided.

A soft compound for HDD gaskets having excellent adhesion properties is provided. A process for making a soft compound for HDD gaskets is also provided.

Herein throughout, unless specifically stated otherwise:

"vinyl-substituted aromatic hydrocarbon" and "alkenylbenzene" are used interchangeably; and "rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

General Nano-Particle Process of Formation

This application incorporates by reference U.S. Ser. No. 09/970,830 (filed Oct. 4, 2001), now U.S. Pat. No. 6,437,050 (issued Aug. 20, 2002), Ser. No. 10/038,748 (filed Dec. 31, 2001), and Ser. No. 10/223,393 (filed Aug. 19, 2002).

One exemplary flower-like polymer nano-particle of the present invention may be formed from triblock polymer chains having at least a poly(conjugated diene) block and at least two poly(alkenylbenzene) blocks. The poly(alkenylbenzene) blocks may be crosslinked to form the desired nanoparticles. The nano-particles have diameters—expressed as a mean average diameter—that are preferably less than about 100 nm, more preferably less than about 75 nm, and most preferably less than about 50 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity less than about 1.3, more preferably less than about 1.2, and most preferably less than about 1.1. Moreover, the nano-particles are preferably spherical, though shape defects are acceptable, provided the nano-particles generally retain their discrete nature with little or no polymerization between particles. The nano-particles have a flower-like shape with substantially no free chain ends remaining within the nano-particles.

The nano-particles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination. However, as more fully described herein below, selection of a solvent in which one polymer forming the nano-particles is more soluble than another polymer forming the nano-particles is important in micelle formation.

With respect to the monomers and solvents identified herein, nano-particles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature and solvent, facilitates the formation of block polymers which form micelles and ultimately the desired nano-particles.

According to one embodiment of the invention, a first triblock polymer is formed of vinyl aromatic hydrocarbon monomers and conjugated diene monomers in the hydrocarbon solvent. The triblock polymer contains a middle block that is soluble in the dispersion solvent, preferably a conjugated diene monomer, and two living end blocks which are less soluble in the dispersion solvent, preferably a vinyl-substituted aromatic hydrocarbon monomer. Moreover, in one preferred embodiment, a vinyl-substituted aromatic hydrocarbon monomer is chosen which is insoluble in the dispersion solvent.

As is known in the art, such a triblock copolymer may be formed by living anionic polymerization, in which a vinyl-substituted aromatic hydrocarbon monomer is added to a completely polymerized conjugated diene monomer. Another method of forming substantially triblock polymers is the living anionic copolymerization of a mixture of monomers, such as a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Under these conditions, the conjugated diene generally polymerizes first, followed by the polymerization of the vinyl-substituted aromatic hydrocarbon. Of course, certain advantages, as described below may be achieved via a random polymerization of at least one block of the polymer.

Nonetheless, it is generally preferred that a vinyl substituted aromatic hydrocarbon polymerize last, positioning on the living ends of the polymerizing polymer at least one vinyl aromatic monomer unit to facilitate later cross-linking.

Figure 2:
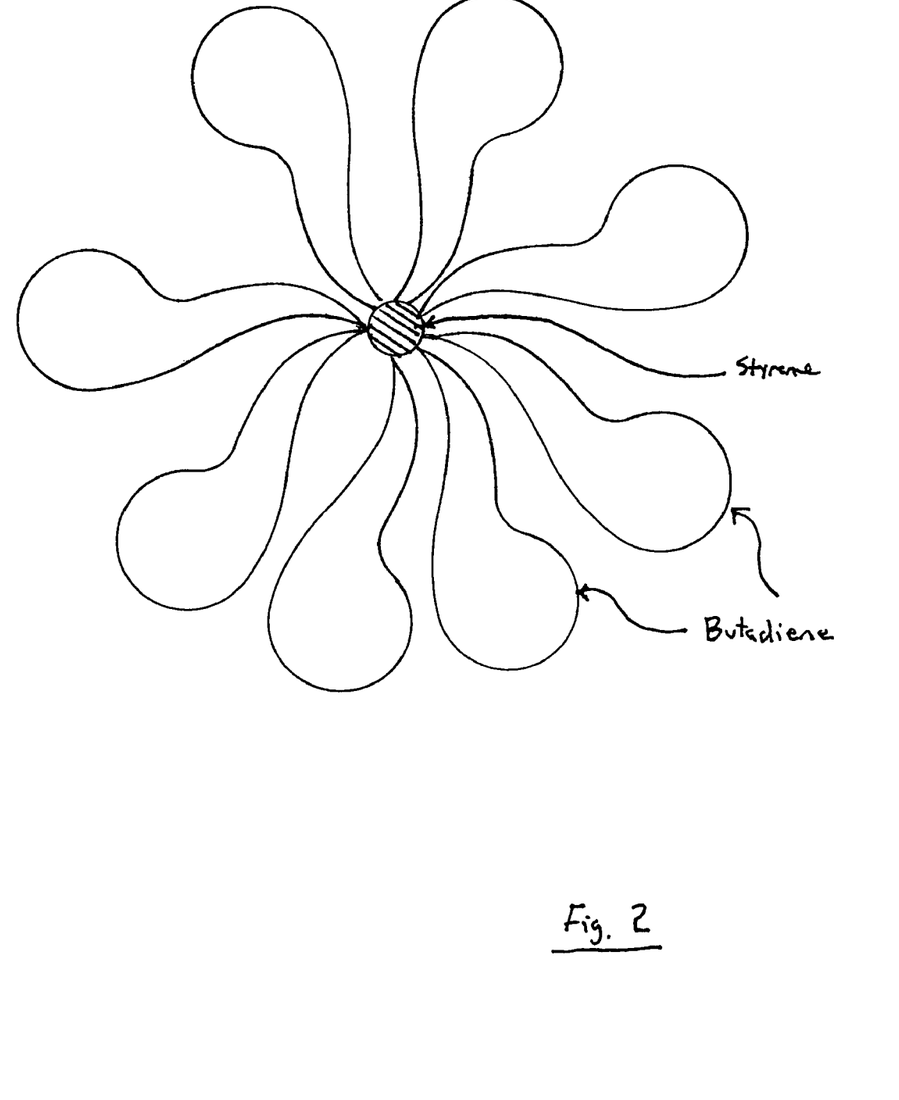
FIG. 2 is a schematic of a single flower-like nano-particle produced according to the present invention.

As seen in FIG. 2, such copolymers, formed by either method, are believed to aggregate to form micelle-like structures, with for example, vinyl-substituted aromatic blocks directed toward the centers of the micelles and conjugated diene blocks as loops extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 40 and 100° C., more preferably between about 50 and 80° C.

After the micelles have formed, additional conjugated diene monomer and/or vinyl-substituted aromatic hydrocarbon monomer can be added to the polymerization mixture as desired.

After formation of the micelles, a cross-linking agent is added to the polymerization mixture. Preferably a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the desired flower-like nano-particle. Consequently, nano-particles are formed from the micelles with a core including, for example, styrene monomer units and a surface layer including, for example, butadiene monomer units.

The conjugated diene monomers contemplated for the block polymer are those soluble in non-aromatic hydrocarbon solvents. $C_4$–$C_8$ conjugated diene monomers are the most preferred. Exemplary conjugated diene monomers include 1,3-butadiene, isoprene, and 1,3-pentadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons, and mixtures thereof.

The triblock polymer preferably has $M_w$ of about 500 to 1,000,000, more preferably between about 10,000 and 5,000,000. A typical triblock polymer will be comprised of 10 to 90% by weight conjugated diene and 10 to 90% by weight vinyl-substituted aromatic hydrocarbon, more preferably 30 to 70% by weight, and most preferably 40 to 60% by weight of each contributed monomer type.

The micelle formed by the polymerization of vinyl-substituted aromatic hydrocarbons and conjugated diene monomers is preferably crosslinked to enhance the uniformity and permanence of shape and size of the resultant flower-like nano-particle. The crosslinking agent preferably migrates to the center of the micelle, i.e., to the vinyl aromatic core, where the living ends of the triblock polymer are located. The living ends are preferably crosslinked to each other, resulting in nano-particles which are substantially free of chain ends. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers, are acceptable. A preferred crosslinking agent is divinylbenzene (DVB).

A 1,2-microstructure controlling agent or randomizing modifier is optionally used to control the 1,2-microstructure in the conjugated diene contributed monomer units, such as 1,3-butadiene, of the nano-particle. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 400 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nano-particle. The 1,2-microstructure content of the conjugated diene units is preferably between about 1% and 99%, more preferably between about 5 and 95%.

Without being bound by theory, it is believed that an exemplary micelle will be comprised of ten to five hundred triblock polymers yielding, after crosslinking, a nano-particle having a $M_w$ of between about 5,000 and 10,000,000, preferably between about 5,000 and 4,500,000.

Hydrogenation of A Nano-Particle Surface Layer

After micelle formation, or alternatively, after crosslinking, the polydiene blocks may be hydrogenated to form a desired surface layer. A hydrogenation step may be carried out by methods known in the art for hydrogenating polymers, particularly polydienes. A preferred hydrogenation method includes placing the crosslinked nano-particles in a hydrogenation reactor in the presence of a catalyst. After the catalyst has been added to the reactor, hydrogen gas ($H_2$) is charged to the reactor to begin the hydrogenation reaction. The pressure is adjusted to a desired range via addition of $H_2$, preferably between about 10 and 3000 kPa, more preferably between about 50 and 2600 kPa. $H_2$ may be charged continuously or in individual charges until the desired conversion is achieved. Preferably, the hydrogenation reaction will reach at least about 20% conversion, more preferably greater than about 85% conversion. The conversion reaction may be monitored by $H^1$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

The surface layer formed by an optional hydrogenation step will vary depending on the identity of the monomer units utilized in the formation of poly (conjugated diene) blocks. For example, if the poly(conjugated diene) block contains 1,3-butadiene monomer units, the resultant nano-particle layer after hydrogenation will be a crystalline poly (ethylene) layer. In another embodiment, a layer may include both ethylene and propylene units after hydrogenation if the non-hydrogenated poly (conjugated diene) block contains isoprene monomer units. It should be noted that the non-hydrogenated poly (conjugated diene) block may contain a mixture of conjugated diene monomer units, resulting in a mixture of monomer units after hydrogenation.

Initiators

The present inventive process is preferably initiated via addition of divalent anionic initiators that are known in the art as useful in the copolymerization of diene monomers and vinyl aromatic hydrocarbons.

As the polymerization initiator, the use of organolithium compounds is preferable. Exemplary organolithium compounds include alkyllithiums such as thyllithium, propyllithium, n-butyllithium, sec-butyllithium, tert-butyllithium and the like; aryllithiums such as phenyllithium, tolyllithium and the like; alkenyllithiums such as vinyllithium, propenyllithium and the like; alkylene dilithiums such as tetramethylene dilithium, pentamethylene dilithium, hexamethylene dilithium, decamethylene dilithium and the like; arylene dilithiums such as 1,3-dilithiobenzene, 1,4-dilithiobenzene and the like; 1,3,5-trilithiocyclohexane, 1,2,5-trilithionapthalene, 1,3,5,8-tetralithiodecane, 1,2,3,5-tetralithio-4-hexyl anthracene and the like, and mixtures thereof. Specific examples of exemplary initiators include alkylene dilithium initiators.

Polymer Nano-Particle Applications

A variety of applications are contemplated for use in conjunction with the nano-particles of the present invention. Furthermore, the several mechanisms described herein for modifying the nano-particles render them suitable for different applications. All forms of the present inventive nano-particles are, of course, contemplated for use in each of the exemplary applications and all other applications envisioned by the skilled artisan.

General Rubber

After the polymer nano-particles have been formed, they may be blended with a rubber to improve the physical characteristics of the rubber composition. Nano-particles, are useful modifying agents for rubbers because they are discrete particles which are capable of dispersing uniformly throughout the rubber composition, resulting in uniformity of physical characteristics. Furthermore, the present polymer nano-particles are advantageous because the surface layer of poly(conjugated diene), especially vinyl-modified poly(conjugated diene), is capable of bonding with the rubber matrix due to the accessibility of the double bonds in the poly(conjugated diene). Moreover, the flower-like nano-particles are substantially free of chain ends due to the crosslinking of the living styrene ends in the core of the nano-particle.

The present polymer nano-particles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the inclusion of the present nano-particles have demonstrated rubbers having improved tensile and tear strength of at least about 30% over a rubber modified with non-spherical copolymers.

Furthermore, nano-particles with hydrogenated surface layers may demonstrate improved compatibility with specific rubbers. For example, nano-particles including a hydrogenated polyisoprene surface layer may demonstrate superior bonding with and improved dispersion in an EPDM rubber matrix due to the compatibility of hydrogenated isoprene with EPDM rubber.

Additionally, nano-particles with copolymer surfaces may demonstrate improved compatibility with rubbers. The copolymer loops within the surface layer of the nano-particles may form a brush-like surface. The host composition is then able to diffuse between the tails allowing improved interaction between the host and the nano-particles.

Surprisingly, the inclusion of flower-like nano-particles with substantially no polymer chain ends results in increased hysteresis values, contrary to previously held theories.

Hard Disk Technology

Hydrogenated nano-particles prepared in accordance with the present invention may also find application in hard disk technology. Disk drive assemblies for computers traditionally include a magnetic storage disk coaxially mounted about a spindle apparatus that rotates at speeds in excess of several thousand revolutions per minute (RPM). The disk drive assemblies also include a magnetic head that writes and reads information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from the environmental contaminant outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives.

The hydrogenated nano-particles, when compounded with a polyalkylene and a rubber, demonstrate a tensile strength comparable to that necessary in hard disk drive compositions.

Thermoplastic Gels

Nano-particles prepared in accord with the present invention, whether hydrogenated or non-hydrogenated may also be blended with a variety of thermoplastic elastomers, such as SEPS, SEBS, EPR, EEBS, EEPS, polypropylene, polyethylene, polystyrene, and mixtures thereof. For example, nano-particles with hydrogenated isoprene surface layers may be blended with a SEPS thermoplastic elastic gel to improve tensile strength and thermostability. These blends of thermoplastic elastomer and nano-particles would typically be extended as known in the art. For example, suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in compositions of the present invention are low molecular weight organic materials having a number-average molecular weight of less than 20,000, preferably less than 10,000, and most preferably less than 5000. Although there is no limitation to the material which may be employed, the following is a list of examples of appropriate materials:

(1) Softening agents, namely aromatic naphthenic and parraffinic softening agents for rubbers or resins;
(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, scbacate, phosphate, polyether and polyester plasticizers for NBR;
(3) Tackifiers, namely coumarone resins, coumaroneindene resins, terpene phenol resins, petroleum hydrocarbons and rosin derivative;
(4) Oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;
(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydrie alcohol ester and fatty acid-polyglycol ester, alcoholic lubricants such as fatty alcohol, polyhydric alcohol, polyglycol and polyglycerol, metallic soaps, and mixed lubricants; and,
(6) Petroleum hydrocarbons, namely synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used in the subject composition as extenders.

Surface functionalized nano-particles prepared in accordance with the present invention, whether hydrogenated or non-hydrogenated, may also be compounded with silica containing rubber compositions. Including surface functionalized nano-particles in silica containing rubber compositions has been shown to decrease the shrinkage rates of such silica containing rubber compositions. Functionalized nano-particles may be compounded in silica compositions in concentrations up to about 30 wt % of the total composition, more preferably up to about 40 wt %, most preferably up to about 50 wt %.

Tire Rubber

One application for such rubber compounds is in tire rubber formulations. Vulcanizable elastomeric compositions of the invention are prepared by mixing a rubber, a nano-particle composition, with a reinforcing filler comprising silica, or a carbon black, or a mixture of the two, a processing aid and/or a coupling agent, a cure agent and an effective amount of sulfur to achieve a satisfactory cure of the composition.

The preferred rubbers are conjugated diene polymers, copolymers or terpolymers of conjugated diene monomers and monovinyl aromatic monomers. These can be utilized as 100 parts of the rubber in the tread stock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, terafluoroethylene-propylene rubber, and the like, and mixtures thereof.

Examples of reinforcing silica fillers which can be used in the vulcanizable elastomeric composition include wet silica (hydrated silicic acid), dry silica (anhydrous silicic acid), calcium silicate, and the like, and mixtures thereof. Other suitable fillers include aluminum silicate, magnesium silicate, and the like, and mixtures thereof. Among these, precipitated amorphous wet-process, hydrated silicas are preferred. Silica can be employed in the amount of about one to about 100 parts per hundred parts of the elastomer (phr), preferably in an amount of about 5 to 80 phr and, more preferably, in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and mixtures thereof, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0, and J. M. Huber Corporation.

Including surface functionalized nano-particles in silica containing rubber compositions has been shown to decrease the shrinkage rates of such silica containing rubber compositions. Functionalized nano-particles may be compounded in silica compositions in concentrations up to about 30 wt % of the total composition, more preferably up to about 40 wt %, most preferably up to about 50 wt %.

The rubber can be compounded with all forms of carbon black, optionally additionally with silica. The carbon black can be present in amounts ranging from about one to about 100 phr. The carbon black can include any of the commonly available, commercially-produced carbon blacks, but those having a surface are of at least 20 $m^2/g$ and, or preferably, at least 35$m^2/g$ up to 200$m^2/g$ or higher are preferred. Among useful carbon blacks are furnace black, channel blacks, and lamp blacks. A mixture of two or more of the above blacks can be used in preparing the carbon black products of the invention. Typical suitable carbon black are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 40 phr.

Numerous coupling agents and compatibilizing agents are known for use in combining silica and rubber. Among the silica-based coupling and compatibilizing agents include silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide (Si69), bis-(3-triethoxysilylpropyl) disulfide (Si75), and those alkyl alkoxysilanes of the such as octyltriethoxy silane, and hexyltrimethoxy silane.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators processing additives, such as oils, resins, including tackifying resins, plasticizers, pigments, additional filers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in the conventional amounts.

Specifically, the above-described nano-particle containing rubber compounds are contemplated for use in rubber compounds used to make tire treads and side walls due to the enhanced reinforcement capabilities of the present nano-particles. The higher dynamic modulus (G') and its lower temperature dependence, along with the lower hysteresis values at high temperatures leads to improved cornering, handling, dry, snow, and wet traction, rolling resistance, dispersion, and aging properties of the resultant tire compositions. Improved aging properties, thermal aging (high temperature), or mechanical aging (static or dynamic deformation cycles), include retention of the G' modulus, hysteresis, mechanical strengths, etc. Nano-particles including a copolymer layer are especially suitable for use in such tire compositions, because the longer copolymer chains in the layer lead to greater diffusion of the host rubber composition into the surface layer of the nano-particle.

Engineering Plastics and Others

Similarly, the nano-particles can be added into typical plastic materials, including polyethylene, polypropylene, polystyrene, polycarbonate, nylon, polyimides, etc., to for example, enhance impact strength, tensile strength and damping properties.

Of course, the present inventive nano-particles are also suited to other presently existing applications for nano-particles, including the medical field, e.g. drug delivery and blood applications, information technology, e.g. quantum computers and dots, aeronautical and space research, energy, eg., oil refining, and lubricants.

Engine Mount, Etc.

Another application for such rubbers is in situations requiring superior damping properties, such as engine mounts and hoses (e.g. air conditioning hoses). Rubber compounds of high mechanical strength, superior damping properties, and strong resistance to creep are demanded in engine mount manufacturing. In engine mounts, a rubber, because it sits most of its life in a packed and hot position, requires very good characteristics. Utilizing the nano-particles within selected rubber formulations can improve the characteristics of the rubber compounds.

The present invention now will be described with reference to non-limiting examples. The following examples and tables are presented for purposes of illustration only and are not to be construed in a limiting sense.

EXAMPLES

Preparation of Initiator

To a clean, dry, $N_2$ purged closed bottle is charged equimolar amounts of triethyl amine and butyllithium. Then 1,3-diisopropenyl benzene is added at a 1:2 molar ratio to the butyllithium. The bottle is heated with agitation for 1.5 hours at 50° C. The resultant product should be used within 7 days or stored in a freezer until use.

Example 1

Preparation of Flower-like Nano-particles

A 7.6 L polymerization reactor (R-11) equipped with external jacket heating and internal agitation was used for the preparation. The reactor was charged with 0.52 kg of hexane and 1 kg of butadiene/hexane blend (~22%). The batch was then heated to 57° C. After the temperature stabilized, polymerization was initiated with 16 mL of a 0.5 M solution of di-lithium initiation agent in hexane. The di-lithium solution was made according to the above procedure.

The batch temperature was maintained at 57° C. for the duration of the polymerization. After 2 hours, the reactor was charged with 0.7 kg of styrene/hexane blend (33 wt % of styrene). After an additional two-hour reaction, the reactor was charged with 2.8 kg of hexane and then 50 mL of divinyl benzene (DVB). The temperature was maintained at 57° C. for another two-hour period. The reactor was then discharged and the product was dropped into an acetone/isopropanol (~95/5) blend, and dried.

Figure 1:
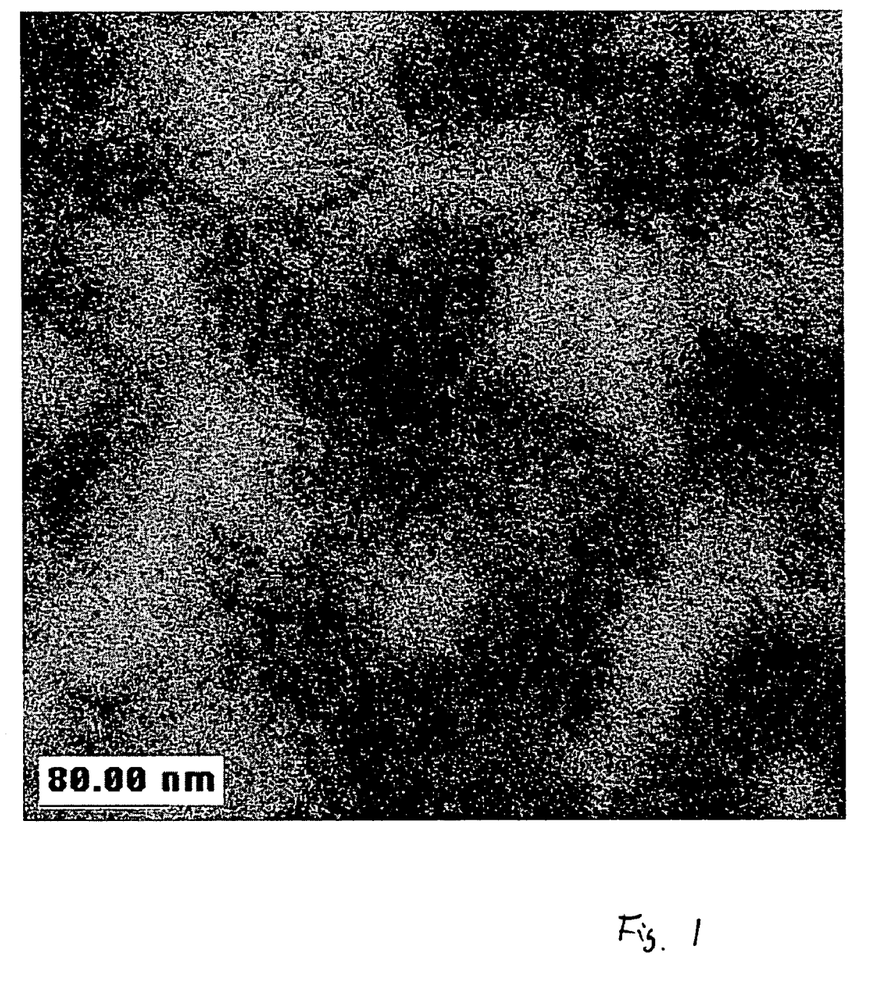
FIG. 1 is a transmission electron microscopy (TEM) photograph of nano-particles formed in accordance with EXAMPLE 1.

GPC analysis of the product showed that polybutadiene segment had a molecular weight ($M_w$) of about 56,700. The polydispersity of the segment was about 1.04. The overall SBS triblock polymer had a ($M_w$) of about 132,300. The polydispersity of the triblock was about 1.07. The flower-like particles were delaminated by transmission electron microscopy (TEM). For TEM analysis, a small amount (~10 mL) solution was taken from the batch and further diluted with a toluene solvent to about $10^{-4}$ wt %. A drop of the diluted solution was then coated on a graphed copper micro-screen and the solvent was evaporated. The screen was then examined by TEM. The results showed. that the average particle size (mean diameter) of the flower-like nano-particles was ~20 nm, and the dispersity of the particle size was about 1.1.

Examples 2–4

Three rubber compositions were prepared according to the formulation shown in Tables 1 and 2 by selectively using the synthesized flower-like polymer particles from Example 1 to replace 10 parts of butadiene rubber in the compound formulation. In each sample, a blend of the ingredients was kneaded by a method listed in Table 3. The final stock was sheeted and molded at 160° C. for 30 minutes.

TABLE 1

| Composition for Mater Batch | (pbw) |
| --- | --- |
| Polybutadiene (HX301) | 100.00 |
| Carbon Black (N343) | 50.00 |
| Aromatic Oil | 15.00 |
| Zinc Oxide | 3.00 |
| Hydrocarbon Resin (tackifiers) | 2.00 |
| Santoflex 13 (antioxidants) | .95 |
| Stearic Acid | 2.00 |
| Wax | 1.00 |

TABLE 2

| Composition for Final Batch | |
| --- | --- |
| Sulfur | ~1.30 |
| Cyclohexyl-benzothiazole sulfenamide (accelerator) | 1.40 |
| Diphenylguanidine (accelerator) | 0.20 |

TABLE 3

| Mixing Conditions | |
| --- | --- |
| Mixer: 300 g Brabender | Agitation Speed: 60 rpm |
| Mater Batch Stage | |
| Initial Temperature | 110° C. |
| 0 min | Charging polymers |
| 0.5 min | Charging oil and Carbon Black |
| 5.0 min | Drop |
| Final Batch Stage | |
| Initial Temperature | 75° C. |
| 0 sec | Charging master stock |
| 30 sec | Charging curing agent and accelerators |
| 75 sec | Drop |

As shown in Table 4, the test compounds exhibited very well balanced physical properties. The tensile strength of the examples including the flower-like particles is better than that of the comparative compounds.

TABLE 4

Summary of Experimental Results

| | Example | | |
|---|---|---|---|
| | 2 | 3 | 4 |
| Example 1 (g) | | 10 | 10 |
| Butadiene rubber (g) | 100 | 90 | 90 |
| Carbon black (g) | 50 | 50 | 50 |
| Aromatic oil (g) | 15 | 15 | 15 |
| Sulfur (g) | 1.7 | 1.3 | 1.3 |
| Mooney Viscosity (130° C. ML-4) | 42.4 | 50.95 | 49.27 |
| CB dispersion Index | 98.6 | 98.7 | 99.4 |
| Shore A | | | |
| 22° C. (3 sec) | 60.7 | 64.1 | 66.0 |
| 100° C. (3 sec) | 60.6 | 61.3 | 64.1 |
| Ring Tensile | | | |
| 23° C., Tb (kPa) | 13,725 | 14,331 | 16,729 |
| Eb (%) | 456 | 448 | 428 |
| M300 | 1050 | 1140 | 1456 |
| M50 | 152 | 187 | 214 |
| Strength (kg/cm) | 29.4 | 33.29 | 35.08 |
| Ring Tear travel (%) 170° C. | 308 | 372 | 317 |
| Tg (° C.) | −72 | −73 | −72 |
| Hysteresis | | | |
| tanδ 50° C. | 0.14698 | 0.19482 | 0.18308 |
| tanδ 23° C. | 0.16789 | 0.21834 | 0.20156 |
| tanδ 0° C. | 0.20041 | 0.24321 | 0.22447 |
| tanδ −20° C. | 0.22803 | 0.27228 | 0.26217 |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A flower-like nano-particle composition comprising:
   a. a poly(alkenylbenzene) core which is crosslinked with a di- or tri-vinyl-substituted aromatic hydrocarbon, and
   b. a polyalkylene surface layer comprising at least one alkylene contributed monomer unit, wherein said nano-particles have a mean average diameter of less than about 100 nm; and said polyalkylene surface layer has substantially no free chain ends.

2. The composition of claim 1 further comprising an initiator residue derived from a divalent anionic polymerization initiator.

3. The composition of claim 1 wherein said poly(alkenylbenzene) core comprises monomer contributed units selected from the group consisting of styrene, α-methyl styrene, 1-vinyl naphthalene, 2-vinyl naphthalene, 1-α-methyl vinyl naphthalene, 2-α-methyl vinyl-naphthalene, vinyl toluene, methoxystyrene, t-butoxystyrene, as well as alkyl, cycloalkyl, aryl, alkaryl, and aralkyl derivatives thereof, in which the total number of carbon atoms in the combined hydrocarbon is not greater than about 18, di- or tri-vinyl substituted aromatic hydrocarbons, and mixtures thereof.

4. The composition of claim 1 wherein said polyalkylene surface layer includes monomer contributed units selected from the group consisting of polyethylene, polypropylene, and mixtures thereof.

5. The composition of claim 1 wherein said polyalkylene surface layer is formed by hydrogenating a poly(conjugated diene) layer.

6. The composition of claim 5 wherein said poly(conjugated diene) layer comprises monomer contributed units selected from the group consisting of 1,3-butadiene, isoprene, 1,3-pentadiene, and mixtures thereof.

* * * * *